B. H. SILLS.
FENDER FOR MOTOR CARS.
APPLICATION FILED MAY 8, 1920.
1,362,195.                          Patented Dec. 14, 1920.
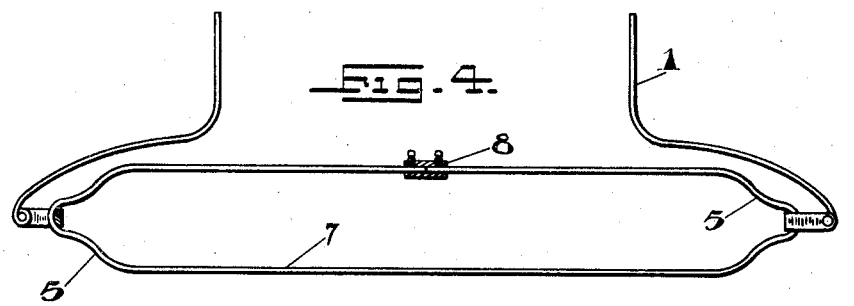
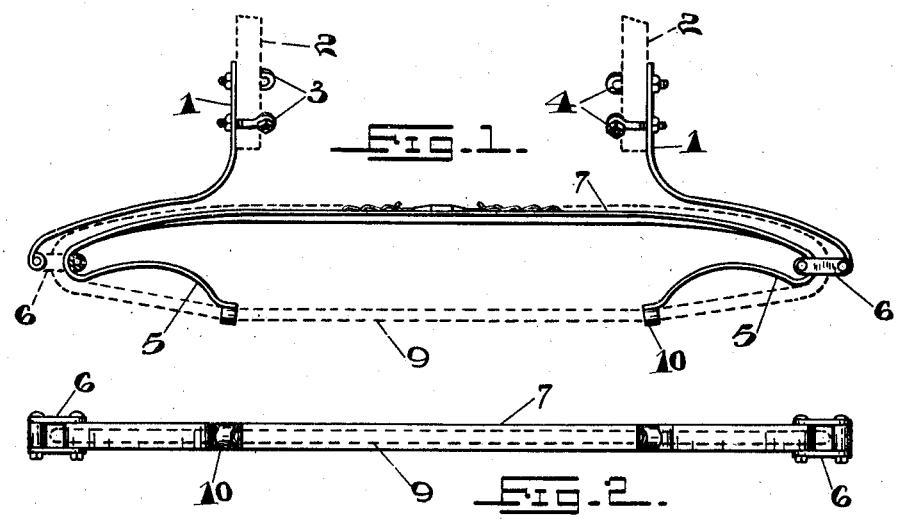
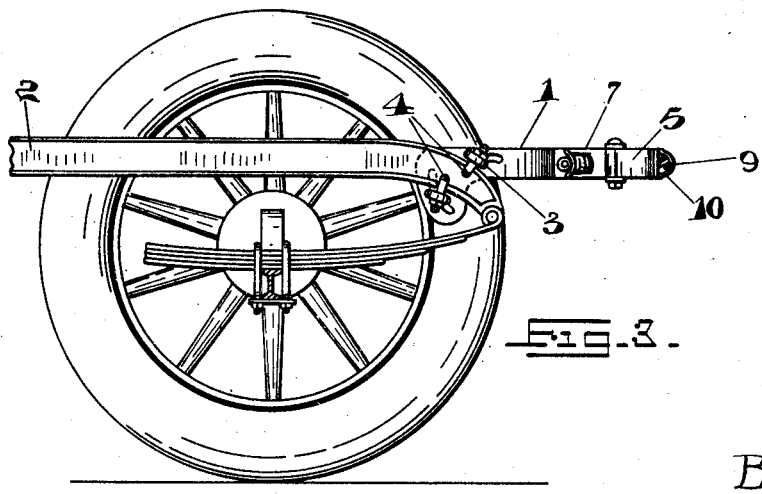
INVENTOR
B.H. Sills.
BY J. Edward Maybee.
ATTY.

UNITED STATES PATENT OFFICE.

BERTON H. SILLS, OF TORONTO, ONTARIO, CANADA.

FENDER FOR MOTOR-CARS.

1,362,195. Specification of Letters Patent. Patented Dec. 14, 1920.

Application filed May 8, 1920. Serial No. 379,961.

*To all whom it may concern:*

Be it known that I, BERTON HERBERT SILLS, of the city of Toronto, in the county of York, Province of Ontario, Canada, a subject of the King of Great Britain, have invented certain new and useful Improvements in Fenders for Motor-Cars, of which the following is a specification.

This invention relates to bumpers or fenders of a construction adapted to resiliently resist impact, and particularly to bumpers employing a chain forming in whole or part the impact receiving portion of the bumper, and my object is to devise a bumper of this type which will be simple in construction, cheap, of good appearance, and adapted to receive and absorb violent impacts without permanent deformation.

I attain my object by means of the constructions hereinafter described and illustrated in the accompanying drawings in which—

Figure 1 is a plan view of a fender constructed in accordance with my invention;

Fig. 2 a front elevation of the same with the chain removed;

Fig. 3 a sectional view of the forward part of a motor car provided with my improved fender; and Fig. 4 a plan view of a modification of the fender.

In the drawings like numerals of reference indicate corresponding parts in the different figures.

1 are the supporting arms adapted to be secured to the side members 2 of the chassis of a motor vehicle. The connections comprise a pair of eye bolts 3 passing through holes in the supporting arms. Through the eye of each bolt is passed a hook bolt 4, the hooks being adapted to engage the flanges of the side members 2 as shown. By tightening up the nuts of the various bolts, the supporting arms are not only clamped against the sides of the members 2, but also against the flanges thereof. As the forward ends of the members 2 are usually turned downwardly as shown, the supporting members are readily tilted to any desired angle by adjusting them backwardly or forwardly of the members 2. The forward ends of the supporting arms are directed laterally and somewhat forwardly, and to their outer ends is connected the impact receiving member.

This impact receiving member comprises bow-shaped ends 5 preferably pivotally connected to the ends of the supporting arms. In Figs. 1 and 2 the pivotal connection is shown as a link 6 pivotally connected both with the end of the supporting arm and the middle portion of the bow-shaped end. In the simplest form of my invention shown in Fig. 4, the bow-shaped ends are connected by flat resilient transverse members 7. These may be made in one piece with the ends 5 and from one bar with the ends suitably joined, for example, by means of the sleeve 8 provided with set screws. An impact receiving member is thus formed comprising two resilient transverse members spaced apart and provided with bow-shaped ends connected with the ends of the supporting arms.

In the preferred form shown in Figs. 1, 2 and 3, the front transverse member 7 is omitted and its place supplied by a chain 9 which passes around the bow-shaped ends 5, which form chain supporting members, and has its ends suitably connected preferably behind the transverse member 7 and by means of a suitable turnbuckle by means of which it may be tensioned. The forward ends of the bow-shaped members 5 have loops 10 formed thereon through which the chain passes, so that it is suitably held from displacement vertically.

The transverse member 7 shown in Figs. 1, 2 and 3 is preferably concaved in vertical cross section as shown to provide stiffness.

By the arrangement shown I attain the objects of my invention as set out in the preamble to this specification. It would further appear that a maximum length of chain is obtained by the construction shown in Figs. 1 to 3, which chain is available as a towing chain or as an emergency tire chain.

What I claim as my invention is:—

1. In a vehicle fender, the combination of an impact receiving member comprising spaced transverse members with bow-shaped ends; and a pair of attaching arms pivotally connected at their forward ends to the bow-shaped ends at the bends.

2. In a vehicle fender, the combination of an impact receiving member comprising spaced transverse members with bow-shaped ends; and a pair of attaching arms connected at their forward ends to said bow-shaped ends by pivotal link connections.

3. In a vehicle fender the combination of a chain support comprising a transverse part provided with bow-shaped ends; a chain carried by and extending between the ends of said chain supports; and a pair of attaching arms pivotally connected at their forward ends to said bow-shaped ends.

4. A vehicle fender as set forth in claim 3 in which the attaching arms are connected by pivotal link connections to the bow-shaped ends.

5. In a vehicle fender, the combination of an impact receiving member comprising spaced transverse members with bow-shaped ends; and a pair of attaching arms, each arm bent outwardly and laterally and pivotally connected at its forward end to the bow-shaped ends at the bends.

6. In a vehicle fender, the combination of an impact receiving member comprising spaced transverse members with bow-shaped ends; and a pair of attaching arms, each arm bent outwardly and laterally and connected at its forward end to said bow-shaped ends by pivotal link connections.

7. In a vehicle fender the combination of bow-shaped chain supports; a chain carried by and extending between said chain supports; and attaching arms pivotally connected at their forward ends to said bow-shaped chain supports.

8. In a vehicle fender the combination of bow-shaped chain supports; a chain carried by and extending between said chain supports; and attaching arms connected at their forward ends by pivotal link connections.

9. In a vehicle fender the combination of a chain support comprising bow-shaped ends, opposite ends of which are connected by a stiff transverse member; a chain carried by and extending between the opposite ends of said bow-shaped ends; and a pair of attaching arms, each arm being bent outwardly and laterally connected at its forward end to said bow shaped ends.

10. A vehicle fender as set forth in claim 3 in which the transverse part of the chain support is concaved in cross section.

11. In a vehicle fender the combination of an impact receiving member comprising bow-shaped ends, opposite ends of which are connected by a stiff transverse member; and a pair of attaching arms, each arm being bent outwardly and laterally and pivotally connected at its forward end to said bow-shaped ends.

Signed at Toronto, Canada, this 19th day of April, 1920.

BERTON H. SILLS.